United States Patent
Canavor et al.

(10) Patent No.: US 11,959,761 B1
(45) Date of Patent: *Apr. 16, 2024

(54) PASSENGER PROFILES FOR AUTONOMOUS VEHICLES

(71) Applicant: Amazon Technologies, Inc., Seattle, WA (US)

(72) Inventors: Darren Ernest Canavor, Redmond, WA (US); Erik Resch Parker, Snohomish, WA (US); Allan Scott Bathurst, Seattle, WA (US); Marshall Friend Tappen, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,471

(22) Filed: Jun. 14, 2022

Related U.S. Application Data

(60) Continuation of application No. 15/935,230, filed on Mar. 26, 2018, now Pat. No. 11,371,857, which is a
(Continued)

(51) Int. Cl.
| | |
|---|---|
| *G01C 21/36* | (2006.01) |
| *G01C 21/34* | (2006.01) |
| *H04W 4/021* | (2018.01) |
| *H04W 4/48* | (2018.01) |
| *H04W 12/06* | (2021.01) |
| *H04W 12/062* | (2021.01) |

(Continued)

(52) U.S. Cl.
CPC ..... *G01C 21/3617* (2013.01); *G01C 21/3461* (2013.01); *H04W 4/021* (2013.01); *H04W 4/48* (2018.02); *H04W 12/062* (2021.01); *H04W 12/065* (2021.01); *H04W 12/068* (2021.01); *H04W 12/069* (2021.01)

(58) Field of Classification Search
CPC ...... G01C 21/206; G08B 7/062; G08B 7/066; G08B 17/117
See application file for complete search history.

(56) References Cited

U.S. PATENT DOCUMENTS

| | | | |
|---|---|---|---|
| 6,305,879 B1 | 10/2001 | Greenwood | |
| 6,504,530 B1 | 1/2003 | Wilson et al. | |

(Continued)

FOREIGN PATENT DOCUMENTS

WO 2015134376 A1 9/2015

OTHER PUBLICATIONS

U.S. Appl. No. 14/868,753, filed Sep. 29, 2015, Final Office Action dated Jul. 21, 2017.
(Continued)

*Primary Examiner* — Rami Khatib
(74) *Attorney, Agent, or Firm* — Athorus, PLLC

(57) ABSTRACT

Disclosed are various embodiments for implementing passenger profiles for autonomous vehicles. A passenger of the autonomous vehicle is identified. A passenger profile corresponding to the passenger and comprising a passenger preference is identified. The passenger preference is identified. A configuration setting of the autonomous vehicle corresponding to autonomous operation of the autonomous vehicle is then adjusted based at least in part on the passenger preference.

20 Claims, 7 Drawing Sheets

Related U.S. Application Data division of application No. 14/868,753, filed on Sep. 29, 2015, now Pat. No. 9,971,348.

(51) Int. Cl.
*H04W 12/065* (2021.01)
*H04W 12/069* (2021.01)

(56) References Cited

U.S. PATENT DOCUMENTS

| | | | |
|---|---|---|---|
| 8,688,306 | B1 | 4/2014 | Nemec et al. |
| 9,147,296 | B2 | 9/2015 | Ricci |
| 9,201,421 | B1 | 12/2015 | Fairfield et al. |
| 9,294,474 | B1 | 3/2016 | Alikhani |
| 2003/0097047 | A1 | 5/2003 | Woltermann et al. |
| 2003/0162523 | A1 | 8/2003 | Kapolka et al. |
| 2006/0178140 | A1 | 8/2006 | Smith et al. |
| 2007/0005609 | A1 | 1/2007 | Breed |
| 2007/0244614 | A1 | 10/2007 | Nathanson |
| 2009/0271609 | A1* | 10/2009 | Baskey ............ H04M 1/72448 713/100 |
| 2010/0157061 | A1 | 6/2010 | Katsman et al. |
| 2010/0222939 | A1 | 9/2010 | Namburu et al. |
| 2012/0083960 | A1 | 4/2012 | Zhu et al. |
| 2013/0211669 | A1* | 8/2013 | DePetro ............... B60N 2/002 701/1 |
| 2013/0231824 | A1 | 9/2013 | Wilson et al. |
| 2013/0238170 | A1 | 9/2013 | Klinger |
| 2013/0297099 | A1 | 11/2013 | Rovik |
| 2014/0172290 | A1 | 6/2014 | Prokhorov et al. |
| 2014/0200737 | A1 | 7/2014 | Lortz et al. |
| 2014/0244678 | A1 | 8/2014 | Zamer et al. |
| 2015/0149023 | A1 | 5/2015 | Attard et al. |
| 2015/0193005 | A1 | 7/2015 | Censo et al. |
| 2015/0291032 | A1 | 10/2015 | Kim et al. |
| 2015/0339912 | A1 | 11/2015 | Farrand et al. |
| 2015/0348112 | A1 | 12/2015 | Ramanujam |
| 2015/0363986 | A1 | 12/2015 | Hoyos et al. |
| 2016/0025973 | A1 | 1/2016 | Guttag et al. |
| 2016/0085565 | A1 | 3/2016 | Arcese et al. |
| 2016/0093212 | A1 | 3/2016 | Barfield et al. |
| 2016/0144959 | A1 | 5/2016 | Meffert |
| 2016/0209220 | A1 | 7/2016 | Laetz |
| 2016/0216711 | A1 | 7/2016 | Srivastava et al. |
| 2016/0247404 | A1 | 8/2016 | Srivastava et al. |
| 2016/0288796 | A1 | 10/2016 | Yuan |
| 2016/0300400 | A1 | 10/2016 | Namikawa |
| 2016/0301698 | A1 | 10/2016 | Katara et al. |
| 2016/0307449 | A1 | 10/2016 | Gordon et al. |
| 2018/0307223 | A1 | 10/2018 | Peeters et al. |

OTHER PUBLICATIONS

U.S. Appl. No. 14/868,753, filed Sep. 29, 2015, Non-Final Office Action dated Mar. 21, 2017.
U.S. Appl. No. 14/868,753, filed Sep. 29, 2015, Non-Final Office Action dated Nov. 16, 2017.
U.S. Appl. No. 14/868,753, filed Sep. 29, 2015, Notice of Allowance dated Jan. 2, 2018.
U.S. Appl. No. 14/868,753, filed Sep. 29, 2015, Response to Final Office Action dated Jul. 21, 2017.
U.S. Appl. No. 14/868,753, filed Sep. 29, 2015, Response to Non-Final Office Action dated Mar. 21, 2017.
U.S. Appl. No. 14/868,753, filed Sep. 29, 2015, Response to Non-Final Office Action dated Nov. 16, 2017.
U.S. Appl. No. 14/868,753, filed Sep. 29, 2015, Response to Restriction/Election dated Dec. 30, 2016.
U.S. Appl. No. 14/868,753, filed Sep. 29, 2015, Restriction/Election dated Dec. 30, 2016.
U.S. Appl. No. 14/868,823, filed Sep. 29, 2015, Non-Final Office Action dated Nov. 2, 2018.
U.S. Appl. No. 14/868,883, filed Sep. 29, 2015, Final Office Action dated May 19, 2017.
U.S. Appl. No. 14/868,883, filed Sep. 29, 2015, Non-Final Office Action dated Sep. 13, 2017.
U.S. Appl. No. 14/868,883, filed Sep. 29, 2015, Non-Final Office Action dated Dec. 7, 2016.
U.S. Appl. No. 14/868,883, filed Sep. 29, 2015, Notice of Allowance dated Jan. 3, 2018.
U.S. Appl. No. 14/868,883, filed Sep. 29, 2015, Response to Non-Final Office Action dated Sep. 13, 2017.
U.S. Appl. No. 14/868,883, filed Sep. 29, 2015, Response to Non-Final Office Action dated Dec. 7, 2016.
U.S. Appl. No. 14/868,883, filed Sep. 29, 2015, Response to Final Office Action dated May 19, 2017.

* cited by examiner

PASSENGER PROFILES FOR AUTONOMOUS VEHICLES

CROSS REFERENCE TO RELATED APPLICATIONS

This is a continuation application of and claims the benefit of U.S. patent application Ser. No. 15/935,230, entitled "Passenger Profiles For Autonomous Vehicles" and filed on Mar. 26, 2018, which is a divisional application that claims priority to, and the benefit of, U.S. patent application Ser. No. 14/868,753, entitled "Passenger Profiles For Autonomous Vehicles" and filed on Sep. 29, 2015, now U.S. Pat. No. 9,971,348, which are both incorporated by reference as if set forth herein in their entireties.

This application is also related to U.S. patent application Ser. No. 14/868,823, entitled "Event Driven Repurposing of Autonomous Vehicles" and filed on Sep. 29, 2015, and U.S. patent application Ser. No. 14/868,883, entitled "Environmental Condition Identification Assistance for Autonomous Vehicles" and filed on Sep. 29, 2015, now U.S. Pat. No. 9,958,870, which are both incorporated by reference herein as if set forth in their entireties.

BACKGROUND

An autonomous vehicle can carry one or more passengers from one destination to another. Different passengers may have different requirements of an autonomous vehicle or preferences regarding the operation of the autonomous vehicle. Moreover, different laws, rules, and regulations may apply to the operation of the autonomous vehicle, depending on which passengers are currently being transported by the autonomous vehicle at that time.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for integrating profiles into the operation of an autonomous vehicle. Profiles may be created for both passengers of the vehicle and for the vehicle itself. The profiles may be used to enforce safety rules and regulations, as well as personalize the autonomous vehicle and tailor its operation to the preferences of the passengers.

A passenger may have previously created a profile, which may be stored in the autonomous vehicle or may be stored with a passenger profile service from which the autonomous vehicle can download the profile. The passenger profile may include information allowing the autonomous vehicle to identify the individual associated with the passenger profile. The passenger profile may also include descriptive data, such as the passenger's age, sex, weight, height, and similar data. The passenger profile may also include data specifying particular preferences of the passenger regarding the operation of the autonomous vehicle.

The autonomous vehicle may also have a vehicle profile. The vehicle profile may specify various rules to be enforced when particular passengers are within the autonomous vehicle or to be enforced when the autonomous vehicle is being operated. For example, a parent may specify in a vehicle profile that child locks be engaged when their children are passengers in the vehicle. As another example, a rental car company may specify in some vehicle profiles that smoking is permitted and in other vehicle profiles that smoking is prohibited, which could affect which vehicles are assigned to particular passengers.

Figure 1:
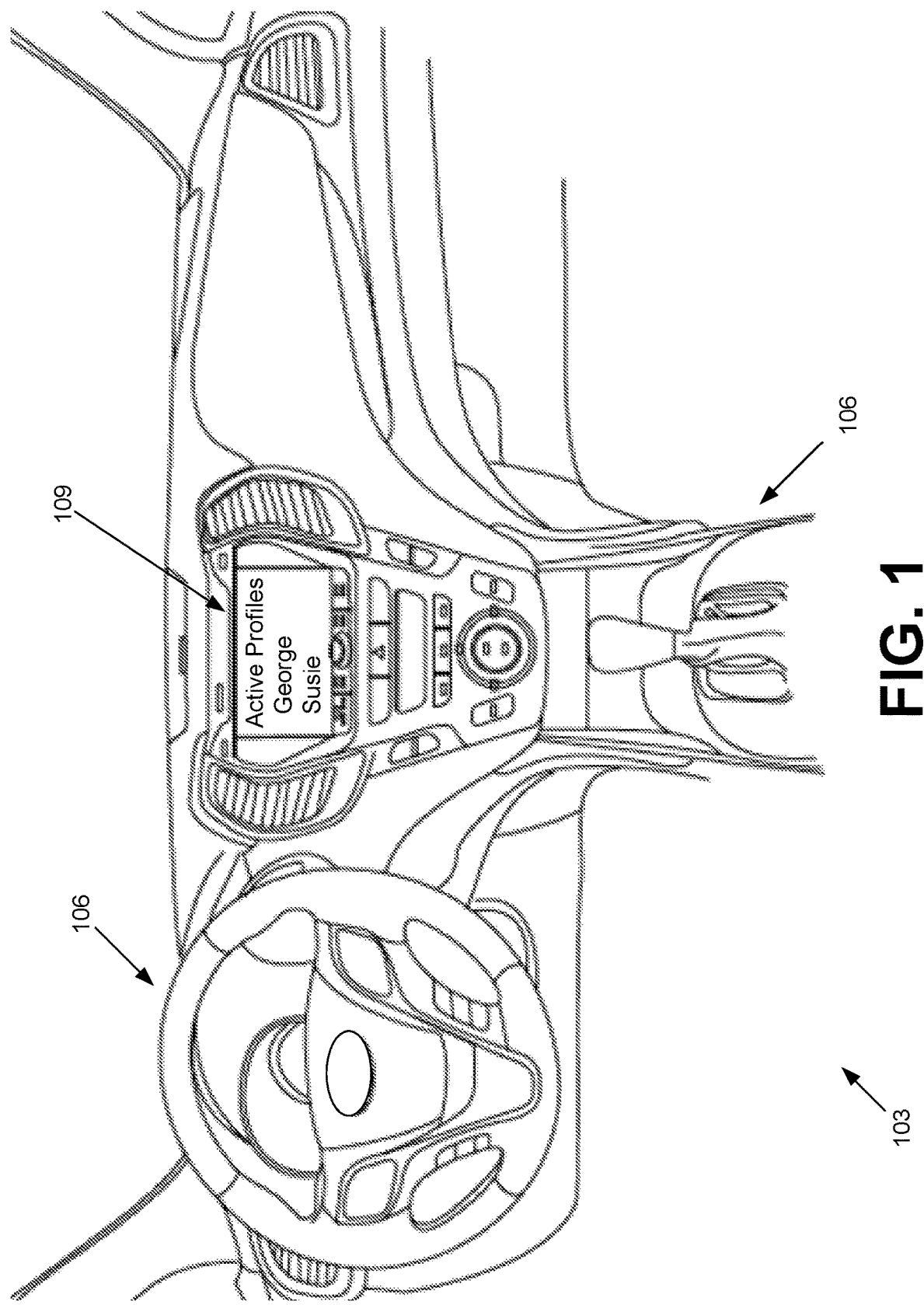
FIG. 1 is a pictorial drawing of an example of several passenger profiles activated for the corresponding passengers of an autonomous vehicle.

With reference to FIG. 1, shown is the interior of an autonomous vehicle 103 according to various embodiments of the present disclosure. In some embodiments, the interior of the autonomous vehicle 103 may have one or more manual controls 106 that allow for a passenger to assume control of the autonomous vehicle 103 and control its operation (e.g., take over driving of an autonomous automobile or piloting an autonomous plane). In various embodiments, a profile list 109 may be rendered on an interior display of the autonomous vehicle. The profile list 109 may show a list of the currently active profiles (e.g., passenger profiles, vehicle profiles, or some combination thereof) that are currently governing the operation of the autonomous vehicle 103.

Figure 2:
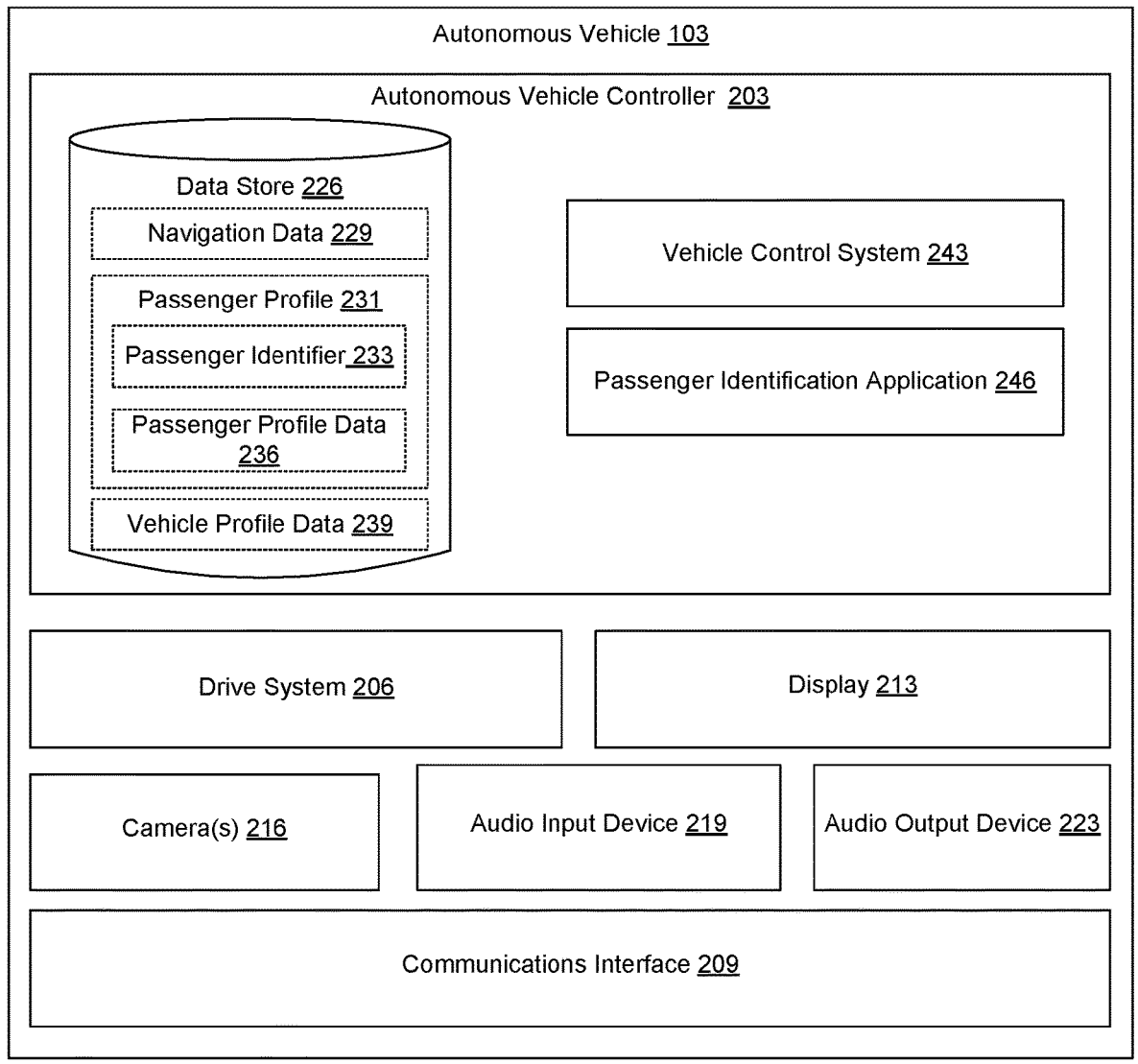
FIG. 2 is a schematic block diagram of the autonomous vehicle of FIG. 1 according to various embodiments of the present disclosure.

Referring next to FIG. 2, shown is an example of a schematic block diagram of the autonomous vehicle 103 according to various embodiments of the present disclosure. The autonomous vehicle 103 may be embodied as any type of vehicle, including, but not limited to, cars, trucks, vans, buses, street cars, trains, subways, aircrafts, boats, etc., regardless of how powered or driven. The autonomous vehicle 103 may include an autonomous vehicle controller 203, a drive system 206, a communications interface 209, a display 213, a camera 216, an audio input device 219, an audio output device 223, and/or other components.

The autonomous vehicle controller 203 may be embodied as analog, digital, or mixed analog and digital processing circuitry and memory that direct the operation of the autonomous vehicle 103 and the electromechanical drive system 206 of the autonomous vehicle 103. In that sense, the autonomous vehicle controller 203 is an example of an embedded real-time control system in which control outputs are produced in response to control input conditions. The autonomous vehicle controller 203 may include various sensors, such as cameras, laser Illuminated detection and ranging sensors (LIDAR), radar, etc., which may be relied upon to analyze the surroundings and develop control signals for operation of the drive system 206. Among embodiments, the autonomous vehicle controller 203 may perform the processing necessary to direct and operate the autonomous vehicle 103 alone or in tandem with other computing systems, including but not limited to the drive system 206, and other computing devices and systems. The autonomous vehicle controller 203 may control the maneuvering operations on surface streets, highways, skyways, waterways, parking lots, etc. The autonomous vehicle controller 203 may also interact with passengers, third-party entities, and/or computing devices for non-mechanical assistance associated with the navigation of the autonomous vehicle 103.

The autonomous vehicle controller 203 is configured to rely upon feedback from its sensors and the drive system 206, for example, to develop an appropriate and suitable route for travel. Among the embodiments, the autonomous vehicle controller 203 may be integrated with the drive system 206 of the autonomous vehicle 103 in any suitable manner to permit the vehicle controller 203 to control the operations of the autonomous vehicle 103, including but not limited to the acceleration, braking, turning, signal and lamp operation, etc. In that sense, the autonomous vehicle controller 203 may be electrically, mechanically, and electromechanically integrated with the drive system 206 and the other elements of the autonomous vehicle 103.

Various applications and/or other functionality may be executed in the autonomous vehicle controller 203 according to various embodiments. Also, various data is stored in the data store 226 that is accessible to the autonomous vehicle controller 203. The data store 226 may be representative of a plurality of data stores 226 as can be appreciated. The data stored in the data store 226, for example, is associated with the operation of the various applications and/or functional entities described below. The data stored in the data store 226 includes, for example, navigation data 229, a passenger profile 231 that includes a passenger identifier 233 and passenger profile data 236, vehicle profile data 239, and potentially other data.

The navigation data 229 may include sensor data and/or other type of data relied upon for navigation of the autonomous vehicle 103, such as map data, street image or view data, roadway data, route data, traffic data, weather data, etc.

The passenger profile 231 may represent information regarding a passenger and data related to their preferences. For example, the passenger profile 231 may also include a passenger identifier 233. The passenger identifier 233 may represent a unique identifier that links a passenger profile 231 to a particular passenger. For example, the passenger identifier 233 may correspond to a username, a serial number, an authentication token, biometric data (e.g., finger prints, facial images, voice samples, etc.), or some combination thereof.

The passenger profile data 236 may include information regarding the passenger associated with the passenger profile 231. For example, the passenger profile data 236 may include user identifying information such as, age, sex, licensing status (e.g., whether the passenger has a driver's license and any limitations associated with the driver's license), known impairments (e.g., near-sighted, far-sighted, impaired motor functions, or other impairments), biometric data (e.g., facial images, voice samples, fingerprint/thumbprint/handprint samples, and/or similar data), and similar user identifying data. The passenger profile data 236 may include a list of various individuals or entities to be contacted in case particular events occurred. For example, the passenger profile data 236 could include information for an emergency contact (e.g., parent, spouse, or other individual), a preferred roadside assistance company, and similar contacts.

As another example, the passenger profile data 236 may also include various preferences for the passenger. These preferences may include preferred settings for the autonomous vehicle 103, such as seat adjustments or positions, temperature, radio stations, child locks engaged or disengaged, and similar settings. These preferences may also include preferred modes of operation of the vehicle, such as a preferred range for travel speeds, whether or not to engage all-wheel or four-wheel drive, driving style modes (e.g., sport driving mode, smooth driving mode, etc.), travel purpose modes (e.g., commuting mode to reach the office quickly, tourism mode to visit local landmarks, etc.), or similar modes. These preferences can also include route or navigation preferences, such as a preference for routes that use surface streets only, routes that use freeways when possible, routes that avoid traffic, routes that go past a particular location, routes that avoid a particular location, routes that use a particular street, routes that avoid a particular street, and similar route or navigation preferences.

The vehicle profile data 239 represents one or more configuration settings or rules specific to the autonomous vehicle 103 as well as data describing the options, systems, and capabilities of the autonomous vehicle 103. For example, the vehicle profile data 239 may specify that the autonomous vehicle 103 must have child locks engaged for the doors when the passenger profile data 236 for a passenger of the autonomous vehicle 103 indicates that the age of the passenger is below a certain threshold. As another example, the vehicle profile data 239 may specify that specific passengers (e.g., children) cannot modify the route of the autonomous vehicle 103 or the final destination of the autonomous vehicle 103.

As further example, the vehicle profile data 239 may specify that the vehicle 103 can only carry previously authorized passengers or can only operate when an authorized passenger is within the autonomous vehicle 103. For example, a rental car agency may specify that the autonomous vehicle 103 can only operate when the lessee is within the autonomous vehicle 103. Similarly, a family may specify that the autonomous vehicle 103 can only operate when a member of the family is within the autonomous vehicle 103.

In some instances, the vehicle profile data 239 could specify that certain individuals be contacted in the event of an emergency or if other specified events were to occur. For example, if the autonomous vehicle 103 had a flat tire while ferrying children to school, the vehicle profile data 239 could specify that an emergency contact listed for each passenger, a roadside assistance company, and the school be notified.

The components executed on the autonomous vehicle controller 203, for example, include a vehicle control system 243, a passenger identification application 246, and/or other applications, services, processes, systems, engines, or functionality not discussed in detail herein. The vehicle control system 243 is executed to control and/or direct the operation of the autonomous vehicle 103 via the drive system 206 and/or other components. In addition, the vehicle control system 243 is executed to evaluate feedback from its sensors and the drive system 206, for example, to develop an appropriate and suitable route for travel. The vehicle control system 243 can also modify various settings or configuration options of the autonomous vehicle 103 based on one or more preferences specified in the passenger profile data 236 and the vehicle profile data 239.

The passenger identification application 246 is executed to identify one or more passengers within the autonomous vehicle 103. The passenger identification application 246 may use one or more approaches to identify a passenger. For example, the passenger identification application 246 may receive a unique identifier 233 (e.g., an identification token) broadcast from a smartphone or similar mobile computing device in data communication with the autonomous vehicle controller 203. The presence of the mobile computing device broadcasting the unique identifier 233 would indicate that the individual identified by the unique identifier 233 is a passenger of the autonomous vehicle 103. As another example, the passenger identification application 246 may use voice recognition techniques to identify passengers based on voices recorded by the audio input device 219. Similarly, the passenger identification application 246 may use facial recognition techniques to identify a passenger photographed by one of the cameras 216. In some embodiments, the passenger identification application 246 may use a combination of these techniques. Other, similar techniques may also be used in appropriate embodiments.

The drive system 206 may be embodied as the powertrain and associated electrical, mechanical, electromechanical, control, and diagnostic systems of the autonomous vehicle 103. Thus, the drive system 206 may include one or more engines, motors, transmissions, steering, braking, and other systems to control the movement of the autonomous vehicle 103 on surface streets, parking lots, etc. As noted above, the drive system 206 operates the autonomous vehicle 103 at the direction of the autonomous vehicle controller 203.

The communications interface 209 may be embodied as one or more physical layer communications systems and associated software interfaces for communication between vehicles 103, client devices of passengers (e.g., smartphones, mobile phones, and similar mobile computing devices), and/or a remote computing environment, via a network. In that context, the communications interface 209 may include one or more wired or wireless (e.g., cellular, satellite, WiFi®, Bluetooth®, etc.) communications interfaces.

The display 213 may include, for example, one or more devices such as liquid crystal display (LCD) displays, gas plasma-based flat panel displays, organic light emitting diode (OLED) displays, LCD projectors, or other types of display devices, etc. In some embodiments, the display 213 may be embedded within the windshield of the autonomous vehicle 103. In other embodiments, the display may be affixed to the windshield. In other embodiments, the display 213 may include a projection device configured to project an inquiry 109 and/or other data onto the windshield 106 and/or other component of the autonomous vehicle 103. The display 213 may also be located in other locations, such as the dashboard or the center console.

The cameras 216 may be embodied as one or more image sensors having a field of view within the passenger cabin of the autonomous vehicle 103 and/or a field of view outside the autonomous vehicle 103. Using the cameras 216, still images and/or video may be relied upon by the autonomous vehicle controller 203 to control the operation of the autonomous vehicle 103, identify passengers of the autonomous vehicle 103, and/or identify passenger responses to presented inquiries. For example, a camera 216 located in the cabin of the autonomous vehicle 103 may capture images of one or more passengers which may be analyzed by facial recognition algorithms to identify the one or more passengers. In other embodiments, a camera 216 may also have a field of view of the display device 213. Accordingly, the camera 216 may be able to capture images and/or video of a passenger interacting with the display device 213. For example, if the passenger interacts with the autonomous vehicle 103 by touching a particular spot of the windshield based in part on a projection of an inquiry, the images and/or video captured by the camera 216 may be processed and analyzed to determine the location of the interaction relative to the screen, thereby determining the intended response of the passenger.

The audio input device 219 may include a microphone and/or other type of similar sensor that is configured to sense, obtain, and/or record audio data. Specifically, the audio input device 219 can be configured to receive audio inputs which may be parsed and/or analyzed by the autonomous vehicle controller 203. The audio inputs obtained via the audio input device 219 may be used for passenger identification, passenger commands, passenger responses, navigation requests, etc. by the passenger identification application 246, vehicle control system 243, and/or any other application.

The audio output device 223 may include a speaker and/or other type of output device. The audio output device 223 can be configured to broadcast audio signals associated with communications and/or other inquiries generated by the autonomous vehicle controller 203.

Figure 3:
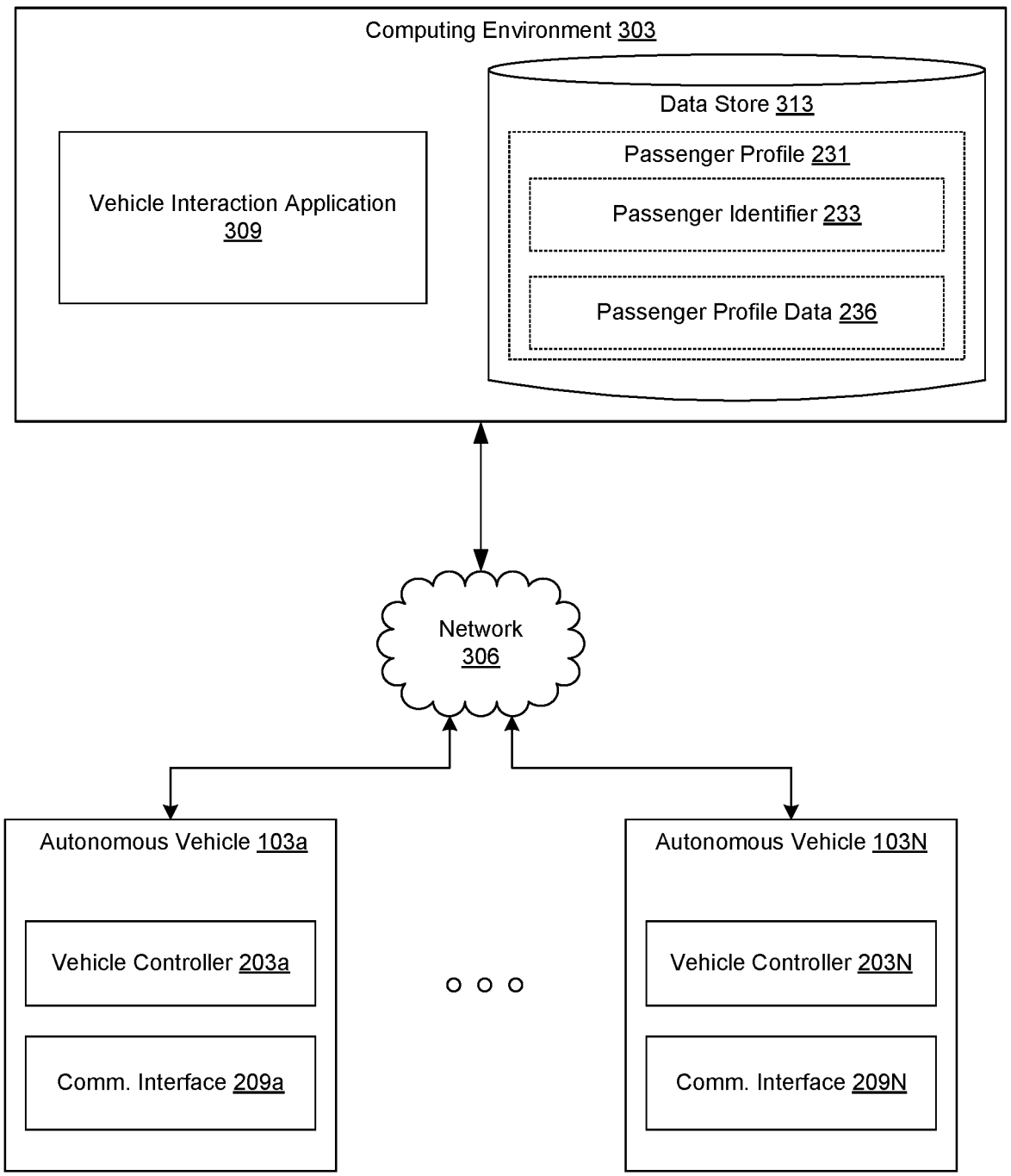
FIG. 3 is a schematic block diagram of a networked environment according to various embodiments of the present disclosure.

Turning now to FIG. 3, shown is an example of a networked environment 300 according to various embodiments. The networked environment 300 includes a computing environment 303 and a plurality of vehicles 103 (e.g., 103a . . . 103N) in data communication with each other via a network 306. The network 306 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 303 may comprise, for example, a server computer or any other system providing computing capability. Alternatively, the computing environment 303 may employ a plurality of computing devices that may be arranged, for example, in one or more server banks or computer banks or other arrangements. Such computing devices may be located in a single installation or may be distributed among many different geographical locations. For example, the computing environment 303 may include a plurality of computing devices that together may comprise a hosted computing resource, a grid computing resource, and/or any other distributed computing arrangement. In some cases, the computing environment 303 may correspond to an elastic computing resource where the allotted capacity of processing, network, storage, or other computing-related resources may vary over time.

Various applications and/or other functionality may be executed in the computing environment 303 according to various embodiments. The components executed in the computing environment 303, for example, include a vehicle interaction application 309, and other applications, services, processes, systems, engines, or functionality not discussed in detail herein. The vehicle interaction application 309 is executed to communicate with the autonomous vehicle controller 203 via the communication interface 209 in order to provide information stored in a data store 313, such as a passenger profile 231 or related data (e.g., the passenger identifier 233 and/or passenger profile data 236), to the autonomous vehicle 103. In some embodiments, the vehicle interaction application 309 may be configured to identify and/or select a passenger profile 231 by comparing data received from the vehicle controller 203 to the passenger identifier 233 of individual passenger profiles 231. The data store 313 may be representative of a plurality of data stores 313 in some embodiments. For example, the data store 313 may correspond to one or more databases, one or more files, one or more data structures, or some combination thereof.

Next, a general description of the operation of the various components of the networked environment 300 is provided. To begin, a passenger enters an autonomous vehicle 103. The autonomous vehicle controller 203 then identifies the passenger.

The autonomous vehicle controller 203 may use one or more approaches to identify a passenger. For example, the autonomous vehicle controller 203 may cause the autonomous vehicle 103 to capture an image of the passenger for facial recognition and provide the captured data to the passenger identification application 246 to match the face of the passenger to a passenger profile 231. As another example, the autonomous vehicle controller 203 may cause the autonomous vehicle 103 to record a voice of the passenger and provide the captured data to the passenger identification application 246 to match the recorded voice to a passenger profile. Alternatively or in addition, the autonomous vehicle controller 203 may cause the autonomous vehicle 103 to capture or receive other biometric data (e.g., fingerprints, thumbprints, hand prints, retinal scans, iris scans, etc.) of the passenger and provide the received biometric data to the passenger identification application 246 to match the received biometric data to a passenger profile. In another example, an electronic device (e.g., mobile phone, smartphone, electronic key, or similar device) may connect to the communications interface 209 of the autonomous vehicle 103 and send a unique identifier (e.g., an identification token, username and password combination, or similar identifier) to the autonomous vehicle 103. Alternatively or in addition, the passenger may be requested to provide a unique identifier, password or other access code, e.g., input manually via the display 213 or another input device, or via audio input captured by the audio input device 219. Alternatively or in addition, the passenger may be requested to provide a unique visual identifier, password or other access code such as a gesture, e.g., via visual input captured by the camera 216. The autonomous vehicle controller 203 may then provide the captured data to the passenger identification application 246 to match the unique identifier with a passenger identifier 233 in a passenger profile 231.

After the passenger has been identified, the vehicle controller 203 may cause the autonomous vehicle 103 to download the corresponding passenger profile 231 for the identified passenger. In such embodiments, the passenger profile 231 may be cached by the autonomous vehicle 103 for later use. In other embodiments, only portions of the passenger profile 231 (e.g., some or all of the passenger profile data 236) are downloaded by the autonomous vehicle 103 as they are needed.

The vehicle controller 203 may then reconfigure, adjust, or otherwise alter one or more configuration settings or the state of the autonomous vehicle 103 based at least in part on information included in the passenger profile data 236. For example, the vehicle controller 203 may change one or more settings to match a passenger preference specified in the passenger profile data 236. As another example, the vehicle controller 203 may change one or more settings or otherwise adjust the state of the autonomous vehicle 103 to comply with one or more predefined rules specified by the vehicle profile data 239 (FIG. 2) in response to determining that the passenger falls within a class of passengers (e.g., children or other classes) for which a predefined rule applies.

After the settings and/or state of the autonomous vehicle 103 have been configured and/or adjusted to comply with passenger preferences and/or vehicle rules, the autonomous vehicle 103 may begin operation. For example, the autonomous vehicle 103 may begin to convey the passengers along a route to a specified or programmed destination.

Figure 4:
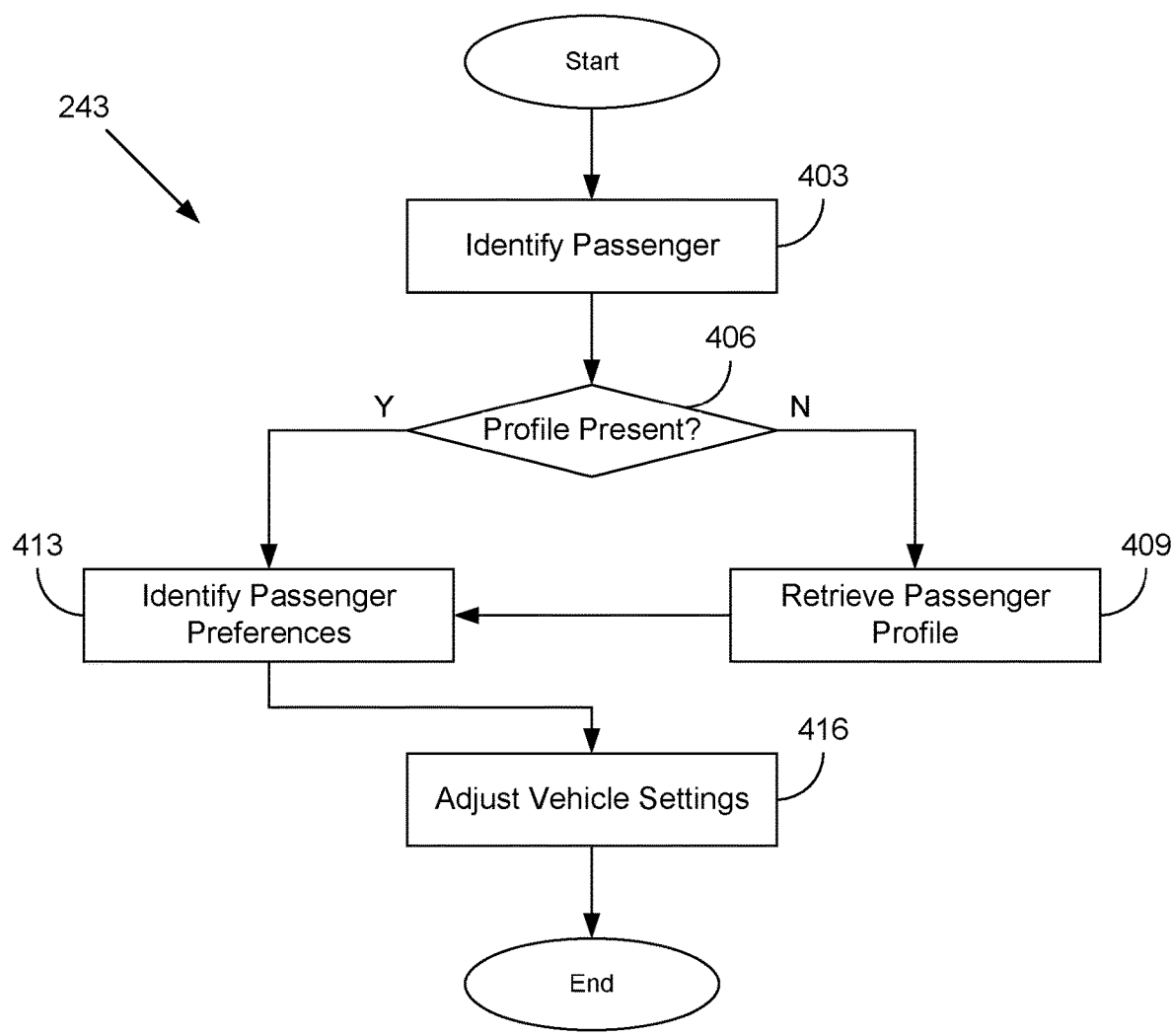
FIG. 4 is a flowchart depicting the operation of various components of the autonomous vehicle depicted in FIG. 2, according to various embodiments of the present disclosure.

Referring next to FIG. 4, shown is a flowchart that provides one example of the operation of a portion of the vehicle control system 243 and/or passenger identification application 246 according to various embodiments. It is understood that the flowchart of FIG. 4 provides merely an example of the many different types of functional arrangements that may be employed to implement the operation of the portion of the vehicle control system 243 and/or passenger identification application 246 as described herein. As an alternative, the flowchart of FIG. 4 may be viewed as depicting an example of elements of a method implemented in the autonomous vehicle 103 (FIG. 2) by the vehicle controller 203 (FIG. 2) according to one or more embodiments.

Beginning with box 403, the autonomous vehicle control system 243 identifies a passenger of the autonomous vehicle 103. One or more approaches may be used to identify the passenger. As previously described, the vehicle control system 243 may cause one or more systems of the autonomous vehicle 103 to capture relevant passenger data. The vehicle control system 243 may then provide the captured data to the passenger identification application 246 in order to identify the current passenger. In some embodiments, several of these approaches may be used together in order to increase the accuracy or efficiency of identifying individual passengers of the autonomous vehicle 103.

A first approach may involve various facial recognition techniques. In these embodiments, the autonomous vehicle control system 243 may cause one or more cameras 216 (FIG. 2) to capture one or more images of a passenger. The vehicle control system 243 may then provide the captured data to the passenger identification application 246 to compare various facial features present in the images of the passenger to facial data stored as the passenger identifier 233 in the passenger profile 231. However, in some embodiments, the vehicle control system 243 may instead cause the autonomous vehicle 103 to upload the images of the passenger to the vehicle interaction application 309 (FIG. 3), which would then compare various facial features present in the images of the passenger to facial data stored as the passenger identifier 233 in the passenger profile 231. In either embodiment, the passenger may be considered to be identified if the various facial features in the images match the facial data in the passenger profile 231.

A second approach may involve various voice recognition techniques. The vehicle control system 243 may cause one or more audio input devices 219 to record or other capture one or more samples of the voice of the passenger. For example, the vehicle control system 243 may begin recording whenever it determines that an audio input device 219 is listening to a voice (e.g., voice-activated). As another example, the vehicle control system 243 may prompt a user (e.g., through audio cue played through an audio output device 223) to begin speaking into an audio input device 219 (e.g., a microphone). The vehicle control system 243 may then provide the captured data to the passenger identification application 246 to compare various aspects of the recorded voice of the passenger to previous recordings of the passenger's voice, as stored in the passenger identifier 233 data of the passenger profile 231. However, in some embodiments, the vehicle control system 243 may instead cause the autonomous vehicle 103 to upload the recorded voice of the passenger to the vehicle interaction application 309 (FIG. 3), which would then compare various aspects of the recorded voice of the passenger to previous recording of the passenger's voice, as stored in the passenger identifier 233 data of the passenger profile 231. In either embodiment, the passenger may be considered to be identified if the recorded voice matches the previously recorded voice sample of the passenger.

A third approach may involve comparing biometric data collected from the passenger with a passenger identifier 233 contained in a passenger profile 231. For example, the vehicle control system 243 may collect biometric data (e.g. fingerprints, thumbprints, hand prints, a retinal scan, an iris scan, or similar data) from a passenger of the autonomous vehicle 103. The vehicle control system 243 may then provide the collected biometric data to the passenger identification application 246 to compare to the biometric data with the passenger identifier 233. If the collected biometric data matches the biometric data stored as the passenger identifier 233, then the passenger may be considered to be identified.

A fourth approach may involve comparing an identifier provided by the passenger with a passenger identifier 233 contained in a passenger profile 231. For example, a passenger may have on their person an electronic device (e.g., mobile phone, smartphone, electronic key, or other device) that is configured to establish a data connection to the autonomous vehicle 103 and broadcast or otherwise provide a unique identifier (e.g., an identification token or similar identifier). The data connection may be established via the communications interface 209 of the autonomous vehicle 103 using a version of the BlueTooth® protocol, various nearfield communications (NFC) protocols, or similar short range wireless personal area networks (PANS). The vehicle control system 243 may then provide the captured data to the passenger identification application 246 to compare the unique identifier with the passenger identifier 233. If the unique identifier provided by the client device matches the passenger identifier 233, then the passenger may be considered to be identified.

A fifth approach may involve prompting the user to enter a username and password combination to identify the passenger. For example, the vehicle control system 243 may cause a prompt to be rendered on a display 213 (FIG. 2) of the autonomous vehicle 103 for a passenger to enter his or her credentials. As another example, the vehicle control system 243 may cause the autonomous vehicle 103 to play a recorded prompt via the audio output device 233 and then wait for the passenger to verbally respond with a username and password. After recording the passenger's response with the audio input device 219, the vehicle control system 243 can identify the username and password spoken and provide the captured data to the passenger identification application 246 to compare them to a username and password combination stored as the passenger identifier 233 in a passenger profile 231. If the usernames and passwords match, then the passenger may be considered to be identified.

A sixth approach may involve detecting a specific gesture made by a passenger, which could operate as a unique identifier of the passenger. For example, the vehicle control system 243 could cause a camera 216 to monitor a passenger and send any captured video involving the passenger to the passenger identification application 246 to identify a gesture (e.g. an arm motion, hand motion, or similar motion). If the identified gesture matches a gesture recorded as the passenger identifier 233 in a passenger profile, then the passenger may be considered to be identified.

Moving on to box 406, the vehicle control system 243 may determine whether the passenger profile 231 for the identified passenger is currently present in the data store 226 (FIG. 2) of the autonomous vehicle controller 203 (FIG. 2) or stored in a remote computing environment 303 (FIG. 3). The passenger profile 231 may have been previously entered or created by a passenger or it may have been previously downloaded via a network 306 (FIG. 3) from a remote computing environment 303. If the passenger profile 231 for the identified passenger is currently stored by the autonomous vehicle 103, then execution skips to box 413. Otherwise, execution proceeds to box 409.

Proceeding next to box 409, the vehicle control system 243 retrieves the passenger profile 231 for the identified passenger from the remote computing environment 303. For example, the vehicle control system 243 may cause the autonomous vehicle 103 to connect to the computing environment 303 via a connection to the network 306 from the communications interface 209. The autonomous vehicle may then receive, download or otherwise copy the passenger profile 231 from the computing environment 303 to the autonomous vehicle 103.

Referring next to box 413, the vehicle control system 243 identifies one or more passenger preferences specified in the passenger profile data 236. In some embodiments, the vehicle control system 243 may select all of the passenger's preferences outlined in the passenger profile data 236. In other embodiments, the vehicle control system 243 may select a subset of the passenger's preferences that are applicable to the autonomous vehicle 103 based at least in part on one or more settings or values specified by the vehicle profile data 239. As a simple example, if the vehicle profile data 239 specifies that the autonomous vehicle 103 lacks climate control, then the vehicle control system 243 may ignore a passenger preference related to settings for the climate control system. Likewise, if the vehicle profile data 239 specifies that the autonomous vehicle is incapable of achieving speeds greater than 35 miles-per-hour, then the vehicle control system 243 may ignore a passenger preference stating a minimum speed of 45 miles-per-hour.

Moving on to box 416, the vehicle control system 243 adjusts configuration settings or otherwise adjusts or modifies the state of the autonomous vehicle 103 based on the applicable passenger preferences. For example, the vehicle control system 243 may adjust one or more waypoints along a route to be traversed by the autonomous vehicle 103 based on a customer preference (e.g., passing by a Starbucks® or Dunkin' Donuts® coffee shop for a coffee drinker, passing by well-known landmarks for a tourist renting an autonomous vehicle, or similar adjustments). As another example, the vehicle control system 243 may adjust one or more legs between two waypoints along a route (e.g., selecting freeways versus surface streets, selecting toll roads versus non-toll roads, or similar adjustments). As another example, the vehicle control system 243 may adjust one or more vehicle settings, such as climate control settings, entertainment system settings (e.g., changing the preset or preferred radio stations), maximum permissible speed, driving style modes, travel purpose modes, and similar settings. After configuring the autonomous vehicle 103 to comport with the passenger preferences, execution of this portion of the vehicle control system 243 subsequently ends.

Figure 5:
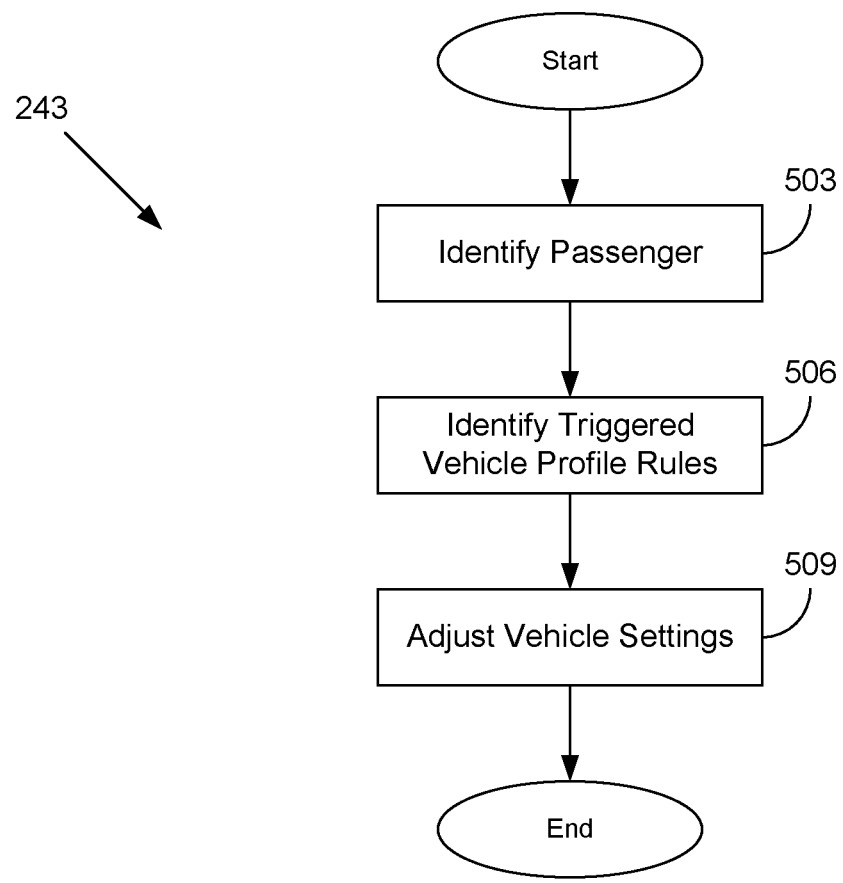
FIG. 5 is a flowchart depicting the operation of various components of the autonomous vehicle depicted in FIG. 2, according to various embodiments of the present disclosure.

Referring next to FIG. 5, shown is a flowchart that provides one example of the operation of a portion of the vehicle control system 243 and/or passenger identification application 246 according to various embodiments. It is understood that the flowchart of FIG. 5 provides merely an example of the many different types of functional arrangements that may be employed to implement the operation of the portion of the vehicle control system 243 and/or passenger identification application 246 as described herein. As an alternative, the flowchart of FIG. 5 may be viewed as depicting an example of elements of a method implemented in the autonomous vehicle 103 (FIG. 3) by the vehicle controller 203 (FIG. 3) according to one or more embodiments.

Beginning with box 503, the autonomous vehicle control system 243 identifies a passenger of the autonomous vehicle 103. One or more approaches may be used to identify the passenger. As previously described, the vehicle control system 243 may cause one or more systems of the autonomous vehicle 103 to capture relevant passenger data. The vehicle control system 243 may then provide the captured data to the passenger identification application 246 in order to identify the current passenger. In some embodiments, several of these approaches may be used together in order to increase the accuracy or efficiency of identifying individual passengers of the autonomous vehicle 103.

A first approach may involve various facial recognition techniques. In these embodiments, the autonomous vehicle control system 243 may cause one or more cameras 216 (FIG. 2) to capture one or more images of a passenger. The vehicle control system 243 may then provide the captured data to the passenger identification application 246 to compare various facial features present in the images of the passenger to facial data stored as the passenger identifier 233 in the passenger profile 231. However, in some embodiments, the vehicle control system 243 may instead cause the autonomous vehicle 103 to upload the images of the passenger to the vehicle interaction application 309 (FIG. 3), which would then compare various facial features present in the images of the passenger to facial data stored as the passenger identifier 233 in the passenger profile 231. In either embodiment, the passenger may be considered to be identified if the various facial features in the images match the facial data in the passenger profile 231.

A second approach may involve various voice recognition techniques. The vehicle control system 243 may cause one or more audio input devices 219 to record or other capture one or more samples of the voice of the passenger. For example, the vehicle control system 243 may begin recording whenever it determines that an audio input device 219 is listening to a voice (e.g., voice-activated). As another example, the vehicle control system 243 may prompt a user (e.g., through audio cue played through an audio output device 223) to begin speaking into an audio input device 219 (e.g., a microphone). The vehicle control system 243 may then provide the captured data to the passenger identification application 246 to compare various aspects of the recorded voice of the passenger to previous recording of the passenger's voice, as stored in the passenger identifier 233 data of the passenger profile 231. However, in some embodiments, the vehicle control system 243 may instead cause the autonomous vehicle 103 to upload the recorded voice of the passenger to the vehicle interaction application 309 (FIG. 3), which would then compare various aspects of the recorded voice of the passenger to previous recording of the passenger's voice, as stored in the passenger identifier 233 data of the passenger profile 231. In either embodiment, the passenger may be considered to be identified if the recorded voice matches the previously recorded voice sample of the passenger.

A third approach may involve comparing biometric data collected from the passenger with a passenger identifier 233 contained in a passenger profile 231. For example, the vehicle control system 243 may collect biometric data (e.g. fingerprints, thumbprints, hand prints, a retinal scan, an iris scan, or similar data) from a passenger of the autonomous vehicle 103. The vehicle control system 243 may then provide the collected biometric data to the passenger identification application 246 to compare to the biometric data with the passenger identifier 233. If the collected biometric data matches the biometric data stored as the passenger identifier 233, then the passenger may be considered to be identified.

A fourth approach may involve comparing an identifier provided by the passenger with a passenger identifier 233 contained in a passenger profile 231. For example, a passenger may have on their person an electronic device (e.g., mobile phone, smartphone, electronic key, or other device) that is configured to establish a data connection to the autonomous vehicle 103 and broadcast or otherwise provide a unique identifier (e.g., an identification token or similar identifier). The data connection may be established via the communications interface 209 of the autonomous vehicle 103 using a version of the BlueTooth® protocol, various nearfield communications (NFC) protocols, or similar short range wireless personal area networks (PANS). The vehicle control system 243 may then provide the captured data to the passenger identification application 246 to compare the unique identifier with the passenger identifier 233. If the unique identifier provided by the client device matches the passenger identifier 233, then the passenger may be considered to be identified.

A fifth approach may involve prompting the user to enter a username and password combination to identify the passenger. For example, the vehicle control system 243 may cause a prompt to be rendered on a display 213 (FIG. 2) of the autonomous vehicle 103 for a passenger to enter his or her credentials. As another example, the vehicle control system 243 may cause the autonomous vehicle 103 to play a recorded prompt via the audio output device 233 and then wait for the passenger to verbally respond with a username and password. After recording the passenger's response with the audio input device 219, the vehicle control system 243 can identify the username and password spoken and provide the captured data to the passenger identification application 246 to compare them to a username and password combination stored as the passenger identifier 233 in a passenger profile 231. If the usernames and passwords match, then the passenger may be considered to be identified.

A sixth approach may involve detecting a specific gesture made by a passenger, which could operate as a unique identifier of the passenger. For example, the vehicle control system 243 could cause a camera 216 to monitor a passenger and send any captured video involving the passenger to the passenger identification application 246 to identify a gesture (e.g. an arm motion, hand motion, or similar motion). If the identified gesture matches a gesture recorded as the passenger identifier 233 in a passenger profile, then the passenger may be considered to be identified.

Moving on to box 506, the vehicle control system 243 identifies which rule or rules specified in the vehicle profile data 239 are triggered for the identified passenger. Based on the passenger profile data 236 associated with the passenger profile 231, the vehicle control system 243 identifies one or more classes of passengers to which the identified passenger belongs. For example, if the passenger profile data 236 indicates that the passenger is under the age of 18, the vehicle control system 243 may determine that the passenger is a child and that certain features of the autonomous vehicle 103 should be enabled or disabled. As another example, if the passenger profile data 236 indicates that the passenger is a young child, then the vehicle profile data 239 may include a rule that the autonomous vehicle 103 cannot begin operation until certain criteria are met (e.g., passenger seated in rear-facing child seat, child locks engaged, an adult passenger is also present within the autonomous vehicle 103, and/or similar applicable safety criteria).

As another example, the vehicle control system 243 may also change one or more geofencing settings of the autonomous vehicle 103. A "geofence" for the autonomous vehicle 103 is an area in which the autonomous vehicle 103 is authorized to operate. With the geofencing settings enable, the autonomous vehicle 103 will refuse to navigate or operate outside of the geofence. For example, the autonomous vehicle 103 may refuse to begin a trip that takes it outside the geofenced area.

Geofences may be specified for a number of reasons. For example, a rental company may specify a default geofence for the autonomous vehicle 103 (e.g., the state in which the autonomous vehicle 103 is rented), and an expanded geofence for the autonomous vehicle 103 for a subset of passengers who have agreed to pay a higher fee (e.g., a surcharge for out of state travel with the autonomous vehicle 103). As another example, parents may have specified a geofence for teenagers when there are no adult passengers within the autonomous vehicle (e.g., a five mile radius from home or a geofenced corridor between home, school, and/or work).

Proceeding next to box 509, the vehicle control system 243 adjusts the state of the autonomous vehicle 103 or otherwise reconfigures the settings of the autonomous vehicle 103 to comport with the rules triggered in the vehicle profile data 239. Execution of this portion of the vehicle control system 243 subsequently ends.

Figure 6:
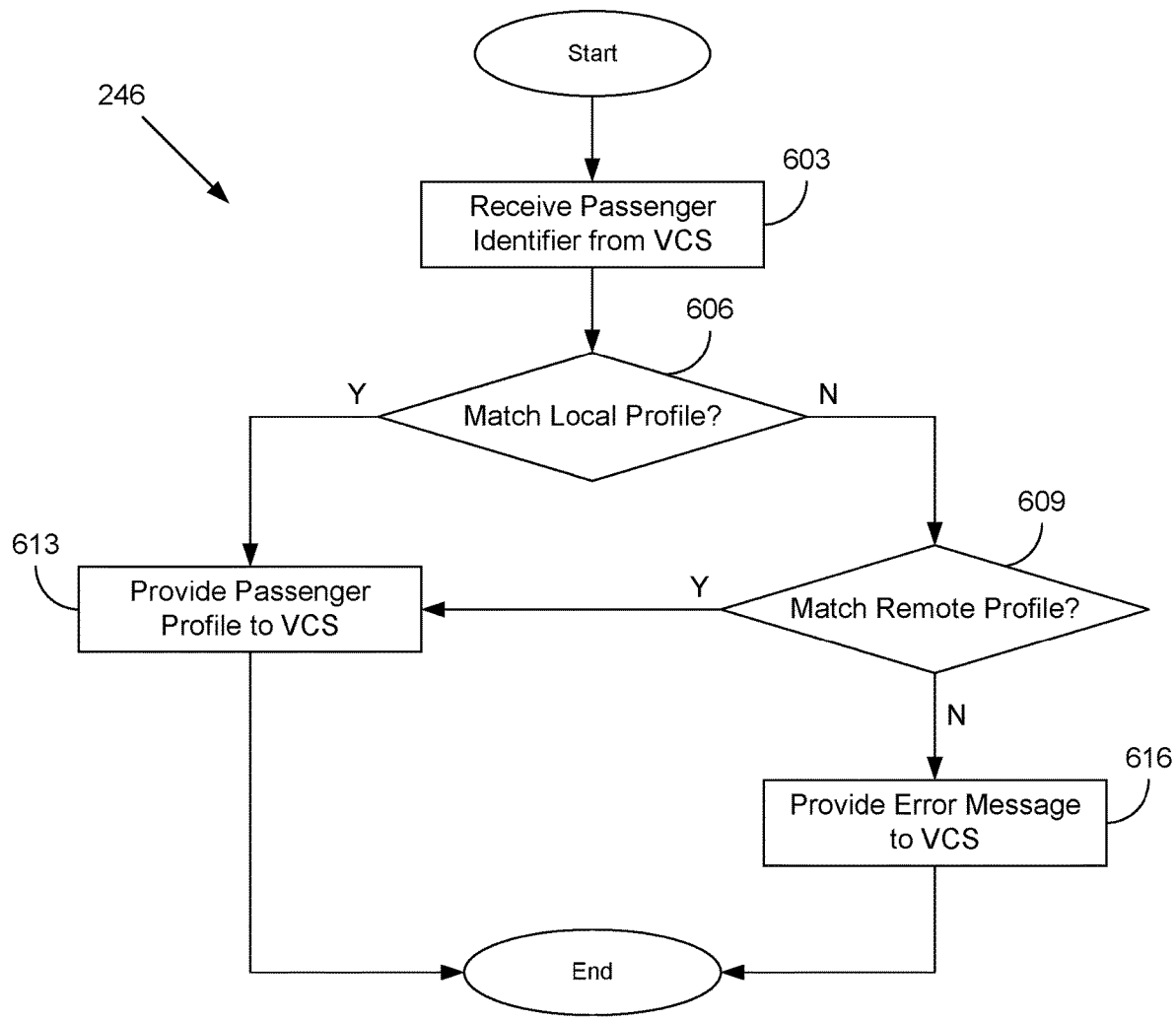
FIG. 6 is a flowchart depicting the operation of various components of the autonomous vehicle depicted in FIG. 2, according to various embodiments of the present disclosure.

Referring next to FIG. 6, shown is a flowchart that provides one example of the operation of a portion of the passenger identification application 246 according to various embodiments. It is understood that the flowchart of FIG. 6 provides merely an example of the many different types of functional arrangements that may be employed to implement the operation of the portion of the passenger identification application 246 as described herein. As an alternative, the flowchart of FIG. 6 may be viewed as depicting an example of elements of a method implemented in the autonomous vehicle 103 (FIG. 3) by the vehicle controller 203 (FIG. 3) according to one or more embodiments.

The portions of the passenger identification application 246 described in FIG. 6 may be performed in coordination with execution of components of the vehicle control system 243 (FIG. 2). For example, the portions the passenger identification application 246 described below may be used in conjunction with execution of the vehicle control system 243 at boxes 403, 406 (FIG. 4). As another example, the portions the passenger identification application 246 described below may be used in conjunction with execution of the vehicle control system 243 at box 503 (FIG. 5).

Beginning at box 603, the passenger identification application 246 receives passenger identification information from the vehicle control system 243. As one example, the passenger identification application 246 may receive one or more images of a passenger captured by one or more cameras 216 (FIG. 2) of the autonomous vehicle 103. As another example, the passenger identification application 246 may receive audio containing a voice sample of a passenger. As another example, the passenger identification application 246 may receive an identifier (e.g., an identification token, a username, a cryptographic certificate, or similar data) associated with the passenger from the vehicle control system 243.

Proceeding next to box 606, the passenger identification application 246 determines whether the passenger identification information matches a passenger identifier 233 of a passenger profile 231 stored locally on the autonomous vehicle 103. Various techniques may be used, depending on the type of passenger identification information received. In some embodiments, such as those where multiple types of passenger identification information are provided by the vehicle control system 243 (e.g., image data and an identifier supplied by a passenger's device), multiple techniques may be used together to increase the accuracy of passenger identification.

As a first example, the passenger identification application 246 may compare an image of a passenger to known facial features of the passenger stored as a passenger identifier 233 in a passenger profile 231. For example, the passenger identification application 246 may analyze the relative position and size of facial features in an image (e.g., eyes, nose, cheekbones, jaw, lips, etc.) and compare them to known positions and sizes of the face of a passenger stored in the passenger profile 231. As another example, the passenger identification application 246 may identify visual details of the skin, including skin tone, lines, wrinkles, spots, color, and complexion.

As a second example, the passenger identification application 246 may compare an audio sample to a known voice sample to identify the passenger. For example, the passenger identification application 246 may compare the frequency of the speaker in an audio sample to a known frequency of the voice of the passenger as stored as a passenger identifier 233 in the passenger profile 231. As another example, the passenger identification application 246 may compare the tone of the speaker in an audio sample to a known tone of the voice of the passenger as stored as a passenger identifier 233 in the passenger profile 231.

As a fourth example, the passenger identification application 246 may compare biometric data provided by vehicle control system 243 to the passenger identifier 233 in a passenger profile 231. Various biometric identification approaches may be used, depending on the type of biometric data collected. Several illustrative examples approaches are discussed below.

As one example, the passenger identification application 246 may compare a fingerprint or thumbprint of a passenger to a fingerprint or thumbprint stored as the passenger identifier 233. The passenger identification application 246 may use various computer vision techniques to detect the patterns formed by the arches, loops, and whorls of ridges on the finger or thumb of a passenger. The passenger identification application 246 may then compare these patterns to a known pattern of arches, loops, and whorls of the finger of the passenger. If the detected pattern of arches, loops, and whorls matches the known pattern of arches, loops, and whorls, then the passenger identification application 246 may determine that the passenger profile 231 matches the passenger in the autonomous vehicle 103.

As a second example, the passenger identification application 246 may compare the hand geometry of a passenger to the known hand geometry of a passenger. The passenger identification application 246 may apply various computer vision techniques to an image of a passenger's hand (e.g. captured by a camera 216 of the autonomous vehicle 103) to identify the relative dimensions of the features of a passenger's hand, such as the relative location and size of the knuckles, fingernails, finger pads, and other features. The passenger identification application 246 may then compare this data to a known hand geometry stored as the passenger identifier 233. If the detected hand geometry matches the known hand geometry, then the passenger identification application 246 may determine that the passenger profile 231 matches the passenger in the autonomous vehicle 103.

In another example, the passenger identification application 246 may compare an iris scan of a passenger, such as an image of an iris captured by a camera 216 (FIG. 2) of the autonomous vehicle, to a known set of rings, furrows, and freckles of the iris of the passenger stored as the passenger identifier 233. The passenger identification application 246 may use various computer vision techniques to identify a set of rings, furrows, and freckles present in the iris scan of the passenger. If the rings, furrows, and freckles of the iris of the passenger match the set of rings, furrows, and freckles stored as the passenger identifier 233, then the passenger identification application 246 may determine that the passenger profile 231 matches the passenger in the autonomous vehicle 103.

In a further example, the passenger identification application 246 may compare a retinal scan of a passenger, such as an image of the passenger's retina captured by a camera 216 of the autonomous vehicle, to a known retinal pattern of the passenger stored as the passenger identifier 233. For example, the passenger identification application 246 may use various computer vision techniques to identify the pattern of blood vessels on a passenger's retina. If this pattern matches a pattern previously stored as the passenger identifier 233, then the passenger identification application 246 may determine that the passenger profile 231 matches the passenger in the autonomous vehicle 103.

As a third example, the passenger identification application 246 may compare a unique identifier, such as a token or a username, provided by an electronic device associated with the passenger (e.g., an electronic key or smartphone) to the passenger identifier 233 in a passenger profile 231. If the unique identifier matches the passenger identifier 233, then the passenger identification application 246 may determine that the passenger profile 231 matches the passenger in the autonomous vehicle 103.

As a fourth example, the passenger identification application 246 may receive a video or image captured by a camera 216 and supplied by the vehicle control system 243. In such an example, the passenger identification application 246 may apply various computer vision techniques to the video or image to identify a gesture or series of gestures made by the passenger. The passenger identification application 246 may then compare the identified gesture or series of gestures to a gesture or series of gestures stored as the passenger identifier 233. If the identified gesture or series of gestures matches the stored gesture or series of gestures, then the passenger identification application 246 may determine that the passenger profile 231 matches the passenger in the autonomous vehicle 103.

In an example where multiple techniques may be used, facial recognition or voice recognition may be used to verify the unique identifier supplied by the passenger's device. For example, if an electronic key is associated with a particular passenger, facial recognition may be used to verify that the passenger is in the vehicle. This could prevent, for example, a stolen key from being used to enable operation of the autonomous vehicle 103.

If the passenger identification 246 determines that the passenger identification information matches a passenger identifier 233 of a passenger profile 231 stored locally on the autonomous vehicle 103, then execution proceeds to box 613. Otherwise, execution proceeds to box 609.

Moving on to box 609, the passenger identification application 246 determines whether the passenger identification information matches a passenger identifier 233 of a passenger profile 231 stored remotely in a data store 313 (FIG. 3) of a remote computing environment 303. For example, the passenger identification application 246 may send the passenger identification information to a vehicle interaction application 309, which then attempts to match the passenger identification information to a passenger identifier 233 of a passenger profile 231 in the data store 313. The vehicle interaction application 309 may use the same or similar techniques as those described above for box 606. If the passenger identification application 246 receives a confirmation from the vehicle interaction application 309 that a matching passenger profile 231 in the data store 313 has been identified, then execution proceeds to box 613. Otherwise, execution proceeds to box 616.

Referring next to box 613, the passenger identification application 246 provides the identified passenger profile 231 to the vehicle control system 243. For example, the passenger identification application 246 may download or otherwise retrieve the passenger profile 231 from the remote computing environment 303. As another example, the passenger identification application 246 may provide a copy or a reference to the identified passenger profile 231 locally stored on the autonomous vehicle 103 to the vehicle control system 243. Execution subsequently ends.

Proceeding instead to box 616, the passenger identification application 246 provides an error message to the vehicle control system 243 indicating that a passenger profile 231 could not be identified. In some instances, a cause or potential cause for the error may also be identified, such as where no passenger profile 233 exists for the passenger (e.g., a new passenger) or where insufficient information was provided to identify the passenger (e.g., blurry images, images obscuring parts of the passenger's face, too much background noise in an audio sample, or similar issues). These error messages may cause the vehicle control system 243 to take an appropriate action, such as prompting the passenger to create a passenger profile 231 or prompting the passenger to position themselves for a better photograph or to minimize background noise while speaking. Execution subsequently ends.

Figure 7:
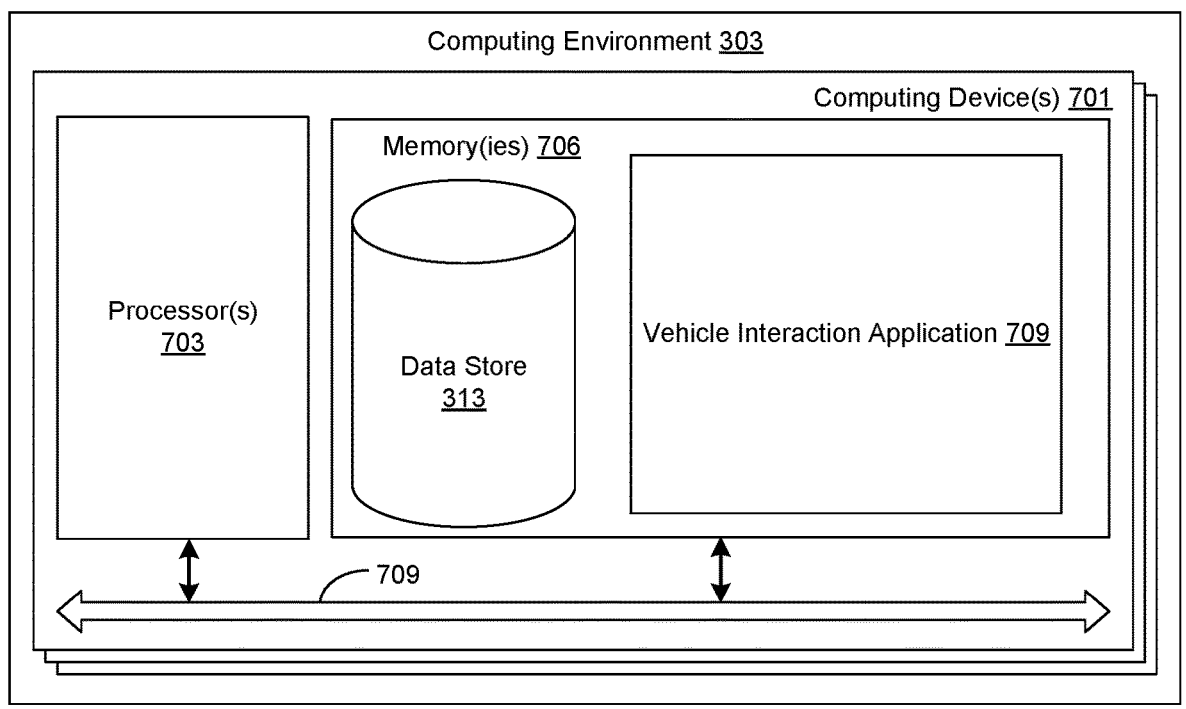
FIG. 7 is a schematic block diagram depicting a computing device operating within the networked environment of FIG. 3 according to various embodiments of the present disclosure.

With reference to FIG. 7, shown is a schematic block diagram of the computing environment 303 according to an embodiment of the present disclosure. The computing environment 303 includes one or more computing devices 701. Each computing device 701 includes at least one processor circuit, for example, having a processor 703 and a memory 706, both of which are coupled to a local interface 709. To this end, each computing device 701 may include, for example, at least one server computer or like device. The local interface 709 may include, for example, a data bus with an accompanying address/control bus or other bus structure as can be appreciated.

Stored in the memory 706 are both data and several components that are executable by the processor 703. In particular, stored in the memory 706 and executable by the processor 703 is the vehicle interaction application 309, and potentially other applications. Also stored in the memory 706 may be a data store 313 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C #, Objective C, Java®, JavaScript, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may include additional systems designed to coordinate this communication, including, for example, performing load balancing. The processor 703 may be of electrical or of some other available construction.

Although the vehicle control system 243, the passenger identification application 246, the vehicle interaction application 309, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4, 5 and 6 show the functionality and operation of an implementation of one or more portions of the vehicle control system 243, the passenger identification application 246, or the vehicle interaction application 309. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 4, 5 and 6 show a specific order of execution, it is understood that the order of execution may differ from that which is depicted. For example, the order of execution of two or more blocks may be scrambled relative to the order shown. Also, two or more blocks shown in succession in FIGS. 4, 5 and 6 may be executed concurrently or with partial concurrence. Further, in some embodiments, one or more of the blocks shown in FIGS. 4, 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the vehicle control system 243, the passenger identification application 246, the vehicle interaction application 309, that includes software or code can be embodied in any non-transitory computer-readable medium for use by or in connection with an instruction execution system such as, for example, a processor 703 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the vehicle control system 243, the passenger identification application 246, the vehicle interaction application 309, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 701 or the same autonomous vehicle controller 203, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. An autonomous vehicle, comprising:
a plurality of sensors; and
a controller configured to:
  obtain, from at least one of the plurality of sensors, information associated with a passenger of the autonomous vehicle;
  determine, based at least in part on the information associated with the passenger, an identity of the passenger;
  identify a vehicle profile for the autonomous vehicle, wherein the vehicle profile includes a plurality of rules specifying a plurality of configurable settings of the autonomous vehicle;
  determine, based at least in part on the identity of the passenger, a passenger profile corresponding to the passenger of the autonomous vehicle;
  determine, based at least in part on the passenger profile corresponding to the passenger of the autonomous vehicle, a first rule from the plurality of rules of the vehicle profile that specifies a first configurable setting of the autonomous vehicle to be enforced during autonomous operation of the autonomous vehicle; and
  configure the first configurable setting of the autonomous vehicle in accordance with the first rule, such that the first rule is enforced during autonomous operation of the autonomous vehicle.

2. The autonomous vehicle of claim 1, wherein the plurality of sensors includes at least one of:
a camera configured to capture at least one of an image of the passenger or a gesture performed by the passenger;
an audio input device configured to capture a voice of the passenger;
a biometric sensor configured to capture biometric information associated with the passenger; or
a communication interface configured to receive an electronic identifier associated with the passenger.

3. The autonomous vehicle of claim 1, wherein the passenger profile includes a plurality of passenger preferences associated with the passenger.

4. The autonomous vehicle of claim 1, wherein:
the controller is further configured to, at least determine, based at least in part on the passenger profile corresponding to the passenger of the autonomous vehicle, a class of passengers to which the passenger belongs; and
determination of the first rule is based at least in part on the class of passengers to which the passenger belongs.

5. The autonomous vehicle of claim 1, wherein the first configurable setting of the autonomous vehicle includes at least one of:
a maximum speed of the autonomous vehicle;
a child lock engagement setting;
a geofenced area defining an authorized area of operation of the autonomous vehicle; or
a vehicle system modification permission setting.

6. An autonomous vehicle, comprising:
one or more processors; and
a memory storing program instructions that, when executed by the one or more processors, cause the one or more processors to at least:
  identify a vehicle profile for the autonomous vehicle, wherein the vehicle profile includes a plurality of rules specifying a plurality of configurable settings of the autonomous vehicle;
  obtain information associated with a passenger of the autonomous vehicle;
  determine, based at least in part on the information associated with the passenger, a passenger profile corresponding to the passenger of the autonomous vehicle;
  identify, based at least in part on the passenger profile, a rule from the plurality of rules of the vehicle profile that specifies a first configurable setting of the autonomous vehicle to be enforced during autonomous operation of the autonomous vehicle; and
  configure the first configurable setting of the autonomous vehicle in accordance with the first rule, such that the first rule is enforced during autonomous operation of the autonomous vehicle.

7. The autonomous vehicle of claim 6, wherein:
the passenger profile corresponding to the passenger of the autonomous vehicle includes a plurality of passenger preferences associated with the passenger; and the program instructions that when executed by the one or more processors, further cause the one or more processors to at least:
   determine that at least one of the plurality of passenger preferences is not applicable to the autonomous vehicle; and
   ignore the at least one plurality of passenger preferences.

8. The autonomous vehicle of claim 6, wherein:
the passenger profile corresponding to the passenger of the autonomous vehicle includes a plurality of passenger preferences associated with the passenger; and
the program instructions that, when executed by the one or more processors, further cause the one or more processors to at least configure the autonomous vehicle in accordance with at least one of the plurality of passenger preferences.

9. The autonomous vehicle of claim 8, wherein configuring the autonomous vehicle in accordance with the at least one of the plurality of passenger preferences includes at least one of:
   determining a way point based at least in part on the at least one of the plurality of passenger preferences;
   determining a leg of a route based at least in part on the at least one of the plurality of passenger preferences;
   determining a maximum speed based at least in part on the at least one of the plurality of passenger preferences; or
   determining a driving style based at least in part on the at least one of the plurality of passenger preferences.

10. The autonomous vehicle of claim 6, wherein the program instructions that, when executed by the one or more processors, further cause the one or more processors to at least:
   determine, based at least in part on the first rule, a geofenced area of autonomous operation for the autonomous vehicle; and
   cause the autonomous vehicle to operate within the geofenced area during autonomous operation of the autonomous vehicle.

11. The autonomous vehicle of claim 6, wherein the program instructions that, when executed by the one or more processors, further cause the one or more processors to at least:
   determine, based at least in part on the passenger profile, a class of passengers to which the passenger belongs; and
   identify the first rule based at least in part on the class of passengers.

12. The autonomous vehicle of claim 6, further comprising a sensor configured to obtain the information associated with the passenger.

13. The autonomous vehicle of claim 12, wherein:
the sensor includes a camera provided within a passenger cabin of the autonomous vehicle; and
the program instructions that, when executed by the one or more processors, further cause the one or more processors to at least:
   cause the camera to capture an image of at least a portion of the passenger;
   detect facial features of the passenger within the image; and
   match the facial features of the passenger to facial data in the passenger profile of the passenger.

14. The autonomous vehicle of claim 12, wherein:
the sensor includes an audio input device provided within a passenger cabin of the autonomous vehicle, and
the program instructions that, when executed by the one or more processors, further cause the one or more processors to at least:
   cause the audio input device to capture a voice sample from the passenger; and
   match the voice sample to voice data in the passenger profile of the passenger.

15. The autonomous vehicle of claim 12, wherein:
the sensor includes a communication interface, and
the program instructions that, when executed by the one or more processors, further cause the one or more processors to at least:
   cause the communication interface to establish a data connection with an electronic device associated with the passenger;
   obtain, via the data connection, an identifier from the electronic device associated with the passenger; and
   match the identifier to a unique identifier in the passenger profile of the passenger.

16. A method, comprising:
obtaining information associated with a passenger within a passenger cabin of an autonomous vehicle;
determining, based at least in part on the information associated with the passenger, a passenger profile corresponding to the passenger of the autonomous vehicle;
determining, based at least in part on the passenger profile corresponding to the passenger of the autonomous vehicle, a class of passengers to which the passenger belongs;
determining, based at least in part on the class of passengers to which the passenger belongs, a first rule from a plurality of rules included in a vehicle profile that specifies a configurable setting of the autonomous vehicle to be enforced during autonomous operation of the autonomous vehicle; and
configuring the configurable setting of the autonomous vehicle in accordance with the first rule, such that the first rule is enforced during autonomous operation of the autonomous vehicle.

17. The method of claim 16, wherein:
the information is obtained from at least one of a plurality of sensors; and
the at least one of the plurality of sensors includes at least one of:
   a camera configured to capture at least one of an image of the passenger or a gesture performed by the passenger;
   an audio input device configured to capture a voice of the passenger;
   a biometric sensor configured to capture biometric information associated with the passenger; or
   a communication interface configured to receive an electronic identifier associated with the passenger.

18. The method of claim 16, further comprising:
configuring the autonomous vehicle in accordance with at least one of a plurality of passenger preferences included in the passenger profile corresponding to the passenger of the autonomous vehicle,
wherein configuring the autonomous vehicle in accordance with the at least one of the plurality of passenger preferences includes at least one of:
   determining a way point based at least in part on the at least one of the plurality of passenger preferences;
   determining a leg of a route based at least in part on the at least one of the plurality of passenger preferences;

determining a maximum speed based at least in part on the at least one of the plurality of passenger preferences; or determining a driving style based at least in part on the at least one of the plurality of passenger preferences.

19. The method of claim 16, further comprising:

determining, based at least in part on the first rule, a geofenced area of autonomous operation for the autonomous vehicle; and causing the autonomous vehicle to operate within the geofenced area during autonomous operation of the autonomous vehicle.

20. The method of claim 16, wherein the configurable setting of the autonomous vehicle includes at least one of:

a maximum speed of the autonomous vehicle;

a child lock engagement setting;

a geofenced area defining an authorized area of operation of the autonomous vehicle; or a vehicle system modification permission setting.

\* \* \* \* \*